(12) United States Patent
Baskins et al.

(10) Patent No.: US 6,785,687 B2
(45) Date of Patent: *Aug. 31, 2004

(54) SYSTEM FOR AND METHOD OF EFFICIENT, EXPANDABLE STORAGE AND RETRIEVAL OF SMALL DATASETS

(75) Inventors: Douglas L. Baskins, Fort Collins, CO (US); Alan Silverstein, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

This patent is subject to a terminal disclaimer.

(21) Appl. No.: 09/874,654

(22) Filed: Jun. 4, 2001

(65) Prior Publication Data

US 2002/0194184 A1 Dec. 19, 2002

(51) Int. Cl.$^7$ .............................................. G60F 17/30
(52) U.S. Cl. ........................... 707/102; 707/101; 707/4; 341/50
(58) Field of Search ................................. 707/1, 3, 4, 5, 707/6, 100, 101, 102, 201; 341/50, 51; 364/251.6, 282.6; 395/600

(56) References Cited

U.S. PATENT DOCUMENTS

| | | | |
|---|---|---|---|
| 5,295,261 A | | 3/1994 | Simonetti |
| 5,530,957 A | | 6/1996 | Koenig |
| 5,557,786 A | * | 9/1996 | Johnson, Jr. ................ 707/101 |
| 5,664,172 A | * | 9/1997 | Antoshenkov ................. 707/4 |
| 5,701,467 A | | 12/1997 | Freeston |
| 5,758,353 A | * | 5/1998 | Marquis ....................... 707/201 |
| 5,829,004 A | | 10/1998 | Au |
| 5,930,805 A | | 7/1999 | Marquis |
| 5,974,411 A | * | 10/1999 | McCool et al. ................. 707/3 |
| 5,987,468 A | | 11/1999 | Singh et al. |
| 6,041,053 A | | 3/2000 | Douceur et al. |
| 6,067,574 A | * | 5/2000 | Tzeng ........................ 709/247 |
| 6,115,716 A | | 9/2000 | Tikkanen et al. |
| 6,167,509 A | | 12/2000 | Sites et al. |
| 6,470,344 B1 | | 10/2002 | Kothuri et al. |
| 6,505,206 B1 | | 1/2003 | Tikkanen et al. |

OTHER PUBLICATIONS

Merrett, T. H., Heping Shang, and Xiaoyan Zhao. "Database Structures, Based on Tries, for Text, Spatial, and General Data." School of COmputer Science, McGill University. 1–11.

Bentley, Jon L. "Multidimensional Binary Search Trees Used for Associative Searching." Association for Computing Machinery, Inc. Vo. 18. No. 9. (Sep. 1975) 509–517.

Jacquet, Philippe and Wojciech Szpankowski. "What we can learn about Suffix Trees from Independent Tries." WADS. (Aug. 1991). 228–239.

Nilsson, Stefan and Matti Tikkanen. "An experimental study of Compression Methods for dynamic Tries." 1–21.

Martinez, Conrad, et al. "Partial match queries in relaxed multidimensional search trees." Austrian–Spanish Scientific Exchange Program. (Sep. 28, 1998). 1–24.

(List continued on next page.)

*Primary Examiner*—Charles Rones

(57) ABSTRACT

An adaptive digital tree data structure supports scalability by encoding type bits within unused data bits of the root pointer word or, as the population increases to support it, into an additional word. In both instances the type bits included in the word or additional word contain dataset-global data which pertains to the underlying data structure. The information contained within the dataset-global data represents the total population of the tree or the amount of memory required to support the tree which may be used to determine the global memory efficiency of the data structure.

23 Claims, 9 Drawing Sheets

| $2^{31}$ | $2^{30}$ | $2^{29}$ | $2^{28}$ | $2^{27}$ | $2^{26}$ | $2^{25}$ | $2^{24}$ | • • • | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
|---|---|---|---|---|---|---|---|---|---|---|---|---|---|---|---|---|---|---|---|---|---|
| 31 | 30 | 29 | 28 | 27 | 26 | 25 | 24 | • • • | 12 | 11 | 10 | 9 | 8 | 7 | 6 | 5 | 4 | 3 | 2 | 1 | 0 |
| $A_{31}$ | $A_{30}$ | $A_{29}$ | $A_{28}$ | $A_{27}$ | $A_{26}$ | $A_{25}$ | $A_{24}$ | • • • | $A_{12}$ | $A_{11}$ | $A_{10}$ | $A_9$ | $A_8$ | $A_7$ | $A_6$ | $A_5$ | $A_4$ | $A_3$ | $A_2$ | $A_1$ | $A_0$ |

MSB                                                                                                              LSB

OTHER PUBLICATIONS

Rais, Bonita, et al. "Typical Behavior of Patricia Tries." Allerton Conference on Communications, Control, and Computing. (Oct. 1990). 924–925.

Kirschenhofer, Peter, et al. "Do we really need to Balance Patricia Tries?"National Science Foundation. 302–316, no date.

Procopiuc, Octavian. "Data Structures for Spatial Systems." (May 12, 1997). 1–20.

Horowitz, Ellis and Sahni Sartaj, "Fundamentals of Data Structure in Pascal," W.H. Freeman and Company, 4th Ed., New York. (1994) 582–595.

Knuth, Donald E., "The Art of Computer Programming," Addison–Wesley Publishing Compnay. Reading, MA. (1973) 490–493.

Sedgewick, Robert. "Algorithms in C," Addison–Wesley Publishing Company, Reading, MA. (1990) 245–258, 265–271, 373–386.

Acharya, Anurag, Huican Zhu, and Kai Shen. "Adaptive Algorithms for Cache–efficeint Trie Search." University of California, Santa Barbara, CA. 1–11, no date.

Bentley, Jon and Robert Sedgewick. "Fast Algorithms for Sorting and Searching Strings." 360–369, no date.

Bentley, Jon and Robert Sedgewick. "Ternary Search Trees." Dr. Dobb's Journal. (Apr. 1998) 1–8.

Ai–suwaiyel, M. and Ellis Horowitz. "Algorithms for Trie Compaction." ACM Transactions on Database Systems, vol. 9, No. 2. (Jun., 1984) 243–263.

Doeringer, Willibald, Gunter Karjoth and Mahdi Nassehi. "Routing on Longest–Matching Prefixes." IEEE/ACM Transactions on Networking, vol. 4, No. 1. (Feb. 1996). 86–97.

Reznik, Yuriy, A. "Some results on Tries with Adaptive Branching." 6th Annual International Conference, COCOON (2000) 148–158.

Knott, Gary D. "Fixed–Bucket Binary Storage Trees" Journal of Algorithms 3, (1982) 276–287.

Luccio, Fabrizio, Mirelle Regnier, Rene Schott. "Discs and Other Related Data Structure," Workshop WADS. (Aug. 1989). 192–205.

Clement, J. P. Flajolet, and B. Vallee. "Dynamical Sources in Information Theory: A general Analysis of Trie Structures," Algorithmica. (2001). 307–369.

European Search Report issued for EP 02 25 3370, dated Feb. 27, 2004.

http://www.geocities.com/SiliconValley/4942/arrays. html—Dynamic Array Routines (6 Pages).

\* cited by examiner

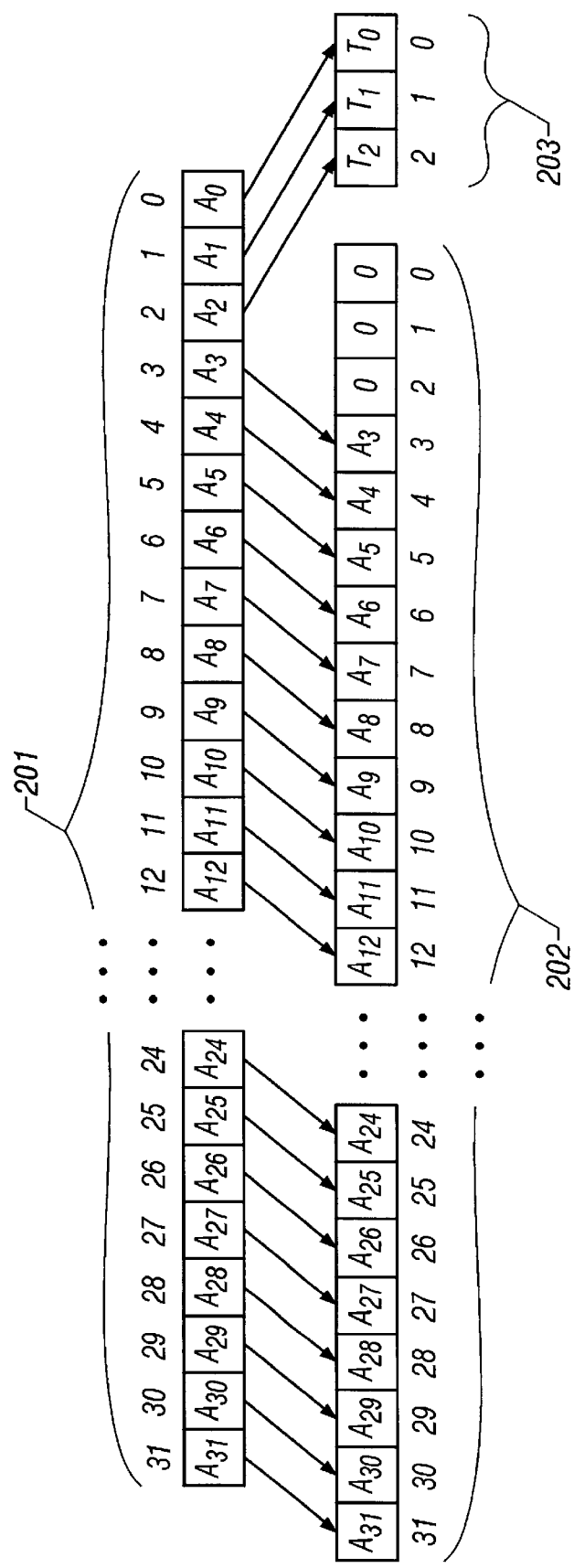

| FIG. 6A-1 | FIG. 6A-2 |
|---|---|
| FIG. 6A-3 | FIG. 6A-4 |

*FIG. 6A*

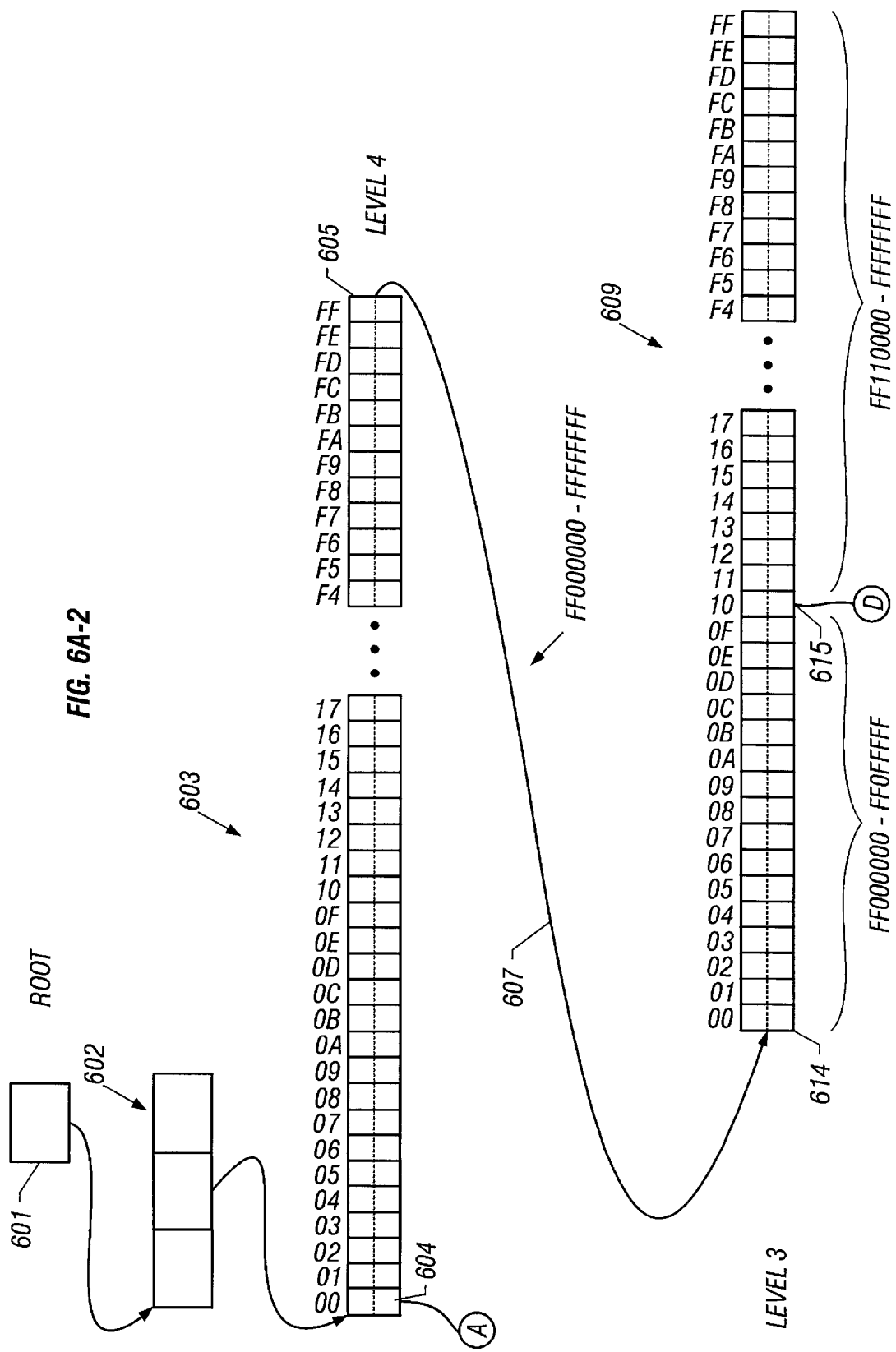

SYSTEM FOR AND METHOD OF EFFICIENT, EXPANDABLE STORAGE AND RETRIEVAL OF SMALL DATASETS

RELATED APPLICATIONS

The present application is related to commonly assigned, concurrently filed U.S. Pat. No. 6,654,760 issued Nov. 5, 2003, entitled "SYSTEM AND METHOD OF PROVIDING A CACHE-EFFICIENT, HYBRID, COMPRESSED DIGITAL TREE WITH WIDE DYNAMIC RANGES AND SIMPLE INTERFACE REQUIRING NO CONFIGURATION OR TUNING"; U.S. patent application Ser. No. 09/874,468, currently pending, entitled "SYSTEM AND METHOD FOR DATA COMPRESSION IN A 'VALUELESS' DIGITAL TREE REPRESENTING A BITSET"; and U.S. Pat. No. 6,671,694, issued on Dec. 30, 2003, "SYSTEM FOR AND METHOD OF CACHE-EFFICIENT DIGITAL TREE WITH RICH POINTERS," the disclosures of which are hereby incorporated herein by reference.

TECHNICAL FIELD

The present invention relates generally to the field of data structures, and more particularly to a dynamic data structure which dynamically adapts storage allocated to describe a population to the size of the population.

BACKGROUND

Computer processors and associated memory components continue to increase in speed. As hardware approaches physical speed limitations, however, other methods for generating appreciable decreases in data access times are required. Even when such limitations are not a factor, maximizing software efficiency maximizes the efficiency of the hardware platform, extending the capabilities of the hardware/software system as a whole. One method of increasing system efficiency is by providing effective data management, achieved by the appropriate choice of data structure and related storage and retrieval algorithms. For example, various prior art data structures and related storage and retrieval algorithms have been developed for data management including arrays, hashing, binary trees, AVL trees (height-balanced binary trees), b-trees, and skiplists. In each of these prior art data structures and related storage and retrieval algorithms an inherent trade-off has existed between providing faster access times and providing lower memory overhead. For example, an array allows for fast indexing through the calculation of the address of a single array element but requires the pre-allocation of the entire array in memory before a single value is stored, and unused intervals of the array waste memory resources. Alternatively, binary trees, AVL trees, b-trees and skiplists do not require the pre-allocation of memory for the data structure and attempt to minimize allocation of unused memory but exhibit an access time which increases as the population increases.

An array is a prior art data structure which has a simplified structure and allows for rapid access of the stored data. However, memory must be allocated for the entire array and the structure is inflexible. An array value is looked up "positionally", or "digitally", by multiplying the index by the size (e.g., number of bytes) allocated to each element of the array and adding the offset of the base address of the array. Typically, a single Central Processing Unit (CPU) cache line fill is required to access the array element and value stored therein. As described and typically implemented, the array is memory inefficient and relatively inflexible. Access, however, is provided as O(1), i.e., independent of the size of the array (ignoring disk swapping).

Alternatively, other data structures previously mentioned including binary trees, b-trees, skiplists and hash tables, are available which are more memory efficient but include undesirable features. For example, hashing is used to convert sparse, possibly multi-word indexes (such as strings) into array indexes. The typical hash table is a fixed-size array, and each index into it is the result of a hashing algorithm performed on the original index. However, in order for hashing to be efficient, the hash algorithm must be matched to the indexes which are to be stored. Hash tables also require every data node to contain a copy of (or a pointer to) the original index (key) so you can distinguish nodes in each synonym chain (or other type of list). Like an array, use of hashing requires some preallocation of memory, but it is normally a fraction of the memory which must be allocated for a flat array, if well designed, i.e., the characteristics of the data to be stored are well known, behaved and matched to the hashing algorithm, collision resolution technique and storage structure implemented.

In particular, digital trees, or tries, provide rapid access to data, but are generally memory inefficient. Memory efficiency may be enhanced for handling sparse index sets by keeping tree branches narrow, resulting in a deeper tree and an increase in the average number of memory references, indirections, and cache line fills, all resulting in slower access to data. This latter factor, i.e., maximizing cache efficiency, is often ignored when such structures are discussed yet may be a dominant factor affecting system performance. A tree is a tree of smaller arrays, or branches, where each branch decodes one or more bits of the index. Prior art digital trees have branch nodes that are arrays of simple pointers or addresses. Typically, the size of the pointers or addresses are minimized to improve the memory efficiency of the digital tree.

At the "bottom" of the digital tree, the last branch decodes the last bits of the index, and the element points to some storage specific to the index. The "leaves" of the tree are these memory chunks for specific indexes, which have application-specific structures.

Digital trees have many advantages including not requiring memory to be allocated to branches which have no indexes or zero population (also called an empty subexpanse). In this case the pointer which points to the empty subexpanse is given a unique value and is called a null pointer indicating that it represents an empty range of indexes. Additionally, the indexes which are stored in a digital tree are accessible in sorted order which allows identification of neighbors. An "expanse" of a digital tree as used herein is the range of values which could be stored within the digital tree, while the population of the digital tree is the set of values that are actually stored within the tree. Similarly, the expanse of a branch of a digital tree is the range of indexes which could be stored within the branch, and the population of a branch is the number of values (e.g., count) which are actually stored within the branch. (As used herein, the term "population" refers to either the set of indexes or the count of those indexes, the meaning of the term being apparent to those skilled in the art from the context in which the term is used.)

"Adaptive Algorithms for Cache-Efficient Tree Search" by Acharya, Zhu and Shen (1999), the disclosure of which is hereby incorporated herein by reference, describes cache-efficient algorithms for tree search. Each of the algorithms use different data structures, including a partitioned-array, B-tree, hashtable, and vectors, to represent different nodes in a trie. The data structure selected depends on cache characteristics as well as the fanout of the node. The algorithms further adapt to changes in the fanout at a node by dynamically switching the data structure used to represent the node. Finally, the size and the layout of individual data structures is determined based on the size of the symbols in the alphabet as well as characteristics of the cache(s). The publication further includes an evaluation of the performance of the algorithms on real and simulated memory hierarchies.

Other publications known and available to those skilled in the art describing data structures include *Fundamentals of Data Structures in Pascal*, 4th Edition; Horowitz and Sahni; pp. 582–594; *The Art of Computer Programming*, Volume 3; Knuth; pp. 490–492; Algorithms in C; Sedgewick; pp. 245–256, 265–271; "Fast Algorithms for Sorting and Searching Strings"; Bentley, Sedgewick; "Ternary Search Trees"; 5871926, INSPEC Abstract Number: C9805-6120-003; Dr Dobb's Journal; "Algorithms for Trie Compaction", ACM Transactions on Database Systems, 9(2):243–63, 1984; "Routing on longest-matching prefixes"; 5217324, INSPEC Abstract Number: B9605-6150M-005, C9605-5640-006; "Some results on tries with adaptive branching"; 6845525, INSPEC Abstract Number: C2001-03-6120-024; "Fixed-bucket binary storage trees"; 01998027, INSPEC Abstract Number: C83009879; "DISCS and other related data structures"; 03730613, INSPEC Abstract Number: C90064501; and "Dynamical sources in information theory: a general analysis of trie structures"; 6841374, INSPEC Abstract Number: B2001-03-6110-014, C2001-03-6120-023, the disclosures of which are hereby incorporated herein by reference.

An enhanced storage structure is described in U.S. patent application Ser. No. 09/457,164 filed Dec. 8, 1999, currently pending, entitled "A FAST EFFICIENT ADAPTIVE, HYBRID TREE," (the '164 application) assigned in common with the instant application and hereby incorporated herein by reference in its entirety. The data structure and storage methods described therein provide a self-adapting structure which self-tunes and configures "expanse" based storage nodes to minimize storage requirements and provide efficient, scalable data storage, search and retrieval capabilities.

An enhancement to the storage structure described in the '164 application is detailed in U.S. Pat. No. 6,735,595, filed Nov. 29, 2000, issued May 11, 2004, entitled "A DATA STRUCTURE AND STORAGE AND RETRIEVAL METHOD SUPPORTING ORDINALITY BASED SEARCHING AND DATA RETRIEVAL", assigned in common with the instant application and hereby incorporated herein by reference. This latter application describes a data structure and related data storage and retrieval method which rapidly provides a count of elements stored or referenced by a hierarchical structure of ordered elements (e.g., a tree), access to elements based on their ordinal value in the structure, and identification of the ordinality of elements. In an ordered tree implementation of the structure, a count of indexes present in each subtree is stored, i.e., the cardinality of each subtree is stored either at or associated with a higher level node pointing to that subtree or at or associated with the head node of the subtree. In addition to data structure specific requirements (e.g., creation of a new node, reassignment of pointers, balancing, etc.) data insertion and deletion includes steps of updating affected counts.

While digital trees provide an "expanse" based storage of information, other structures are also used to store data including, for example, b-trees, AVL trees, and binary trees that use a divide-by-population storage scheme (referred to as a binary storage tree) in which keys are compared with whole key values stored in each node. In these, and other storage structures, dynamic manipulation of the structure (including insertion and deletion of indexes and rebalancing operations) is highly dependent upon pointer structures, i.e., a special type of variable that holds a memory address (that is, it points to a memory location). However, while pointers provide for efficient "traversal" of dynamic data structures, each "redirection" to another portion of the structure often entails a memory access operation to retrieve the "pointed to" node. That is, when data locality is not maintained, traversal of the data structure suffers by requiring the completion of relatively slow memory access operations before processing can continue.

Accordingly, a need exists for techniques and tools to optimize performance characteristics of a data structure to more effectively utilize pointer objects and constructs.

SUMMARY OF THE INVENTION

The invention is directed to a dynamic pointer construct which dynamically allocates memory storing data about a referenced structure commensurate with the size of the population. When the population is null or small, information about the population, such as a count of the population, is hidden within unused portions of an otherwise conventional pointer. As the population grows, an auxiliary data structure is spawned and may be inserted between the pointer and the referenced structure. Thus, this overhead information describing a target object is provided using unused bits of a pointer until such time as the population referenced grows to a point where additional memory may be allocated for this and additional information, the additional memory overhead being amortized over the larger population.

While the invention is applicable to a wide variety of objects that might be referenced by a pointer, including, for example, arrays, parameter lists, executables, etc., it is particularly applicable to structures having a large number of pointers, such as trees. Thus, the invention may be incorporated into a data structure including a root pointer addressing or "pointing to" a tree including a plurality of nodes comprising branches and/or leaves. The nodes are preferably arranged in a hierarchical structure so that each interior or branch node forms the root of a subtree, pointing to one or more subsidiary nodes of the tree using a pointer construct. Preferably, each node is some minimum size which is some whole multiple of a minimum addressable unit supported by a pointer (e.g., word addressability) and consistently aligned in memory (i.e., each node begins at an address having the same value of its least significant bits), such that some number of least significant bits of the parent pointer are always unused for addressing purposes. These unused bits are used instead to store information about the target object of the pointer, i.e., the pointed-to node in the case of small populations, such that these low order bits comprise an auxiliary data field. Since a pointer is typically a single word in size, the auxiliary data field is accessed by appropriate masking of the pointer word, while conventional pointer operations are supported by "masking out" the auxiliary data field bits to bring the pointer back into proper node pointing alignment.

As the population size of a tree or subtree exceeds a threshold value, i.e., a threshold number of indexes, a separate data structure may be created to store additional data about the target object, the tree pointer redirected to the separate data structure, and the auxiliary data field set to indicate that the auxiliary structure is now the target of the pointer.

BRIEF DESCRIPTION OF THE DRAWINGS

FIG. 2 is a diagram of a mapping of the 32-bit pointer of FIG. 1 into a masked big-endian address component and a type field;

DETAILED DESCRIPTION

Figure 3:
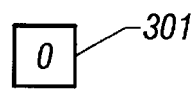
FIG. 3 is a diagram of a null-type root pointer.

Various embodiments of the present invention include an encoded pointer that otherwise acts like an ordinary (simple) pointer; including a data field storing type information. Other information may also be stored (specifically a low population number), with at least three types: null, low-population, higher-population. Embedding a data field in a root or subsidiary pointer is enabled by a corresponding data structure's nodes having some minimum size and aligned such that not all address bits of the pointer are needed to address the nodes. The low-population type(s) support very fast access, while the higher-population type(s) support global data useful for managing a higher-population data structure efficiently and, thus, extensibility. The encoded pointer in combination with an auxiliary data structure supporting higher populations may be used in a variety of environments including, for example, as a root pointer to a structure such as a tree, within a tree linking nodes of the tree, to reference an array or other data structure, or even to reference an executable object that might vary in size such that it is beneficial to include information about the target object commensurate with the size of the object.

For purposes of illustration, a preferred embodiment of the invention will be described in terms of a digital tree object to be referenced by a pointer mechanism according to the invention. As previously described, typical trees, including digital trees, exhibit several disadvantages caused by the dynamic nature of the structure. This dynamic nature necessitates the use of pointers that require redirecting a program to another portion of memory as tree traversal requires transition from one node to another. The invention addresses this problem by eliminating redundant address data present in a conventional pointer and instead using these redundant address bits to provide information about the target object, e.g., interior or terminal (branch or leaf) node pointed to by the pointer, thereby allowing low population trees or nodes to be accessed faster and more directly. This supports applications that need huge numbers of these data structures (i.e., trees) each or most having a very low population. These nodes are some minimum number of words in size, e.g., at least eight bytes, with all nodes typically aligned along some corresponding memory boundary such that the least significant bits are not used; usually, but not necessarily, "zeros". The invention takes advantage of these unused bits by encoding data about the target object (e.g., node, structure, etc.) into these bits when the size of the target is relatively small (e.g., a tree with a limited population of indexes stored therein). Thus, for example, the least significant three bits of a pointer may be masked off and used to designate a type of node or subtree being pointed to by the pointer, etc.

As the amount of data stored in the data structure grows, the unused pointer bits may be used to identify the existence of a specialized, auxiliary structure storing information about the target object, e.g., the tree or subtree originally directly referenced by, and now indirectly referenced by a root pointer. This transition occurs as it becomes practical to amortize memory needed for global data which holds the additional type and other information related to the target object over the increased size and/or number of objects referenced or accessible by, for example, a data structure.

As described, while the invention is applicable to a wide range of data structures, and is not limited to graphs, directed graphs, trees, or digital trees, a preferred embodiment of the invention may be implemented in the context of a digital tree. In particular, the structure and arrangement of a pointer and related constructs according to certain embodiments of the present invention has been the subject of development in the adaptive, hybrid tree data structure that is the subject of some of the previously cited patent applications. Accordingly, while a preferred embodiment of the invention is described herein within the framework of such a digital tree data structure, it is to be understood that the invention is not so limited except as specifically detailed by the appended claims.

Thus, according to a preferred embodiment of the present invention, the advantages of, for example, a digital tree may be combined with smarter approaches to storing usable information within words within the data structure handling both non-terminal (i. e., interior) nodes (branches) and terminal nodes (leaves) in the tree. These smarter approaches minimize both memory space and processing time, for lookups, insertions and modifications of data stored in the data structure. Additionally, a preferred embodiment of the present invention ensures the data structure remains efficient as indexes are added to or deleted from the data structure. The approaches used by a preferred embodiment include forms of type-encoded root pointers which represent a code for the type of object to which the pointer points, and tree-global data which carries "global" information about the tree.

The smallest object in a data structure of a preferred embodiment is at least two words in size and each of these objects are self-aligned in memory. A root pointer in a preferred embodiment therefore always points to at least an 8-byte object on a 32-bit system, so the least three (or more) bits of the pointer are zero. More generally, single-word root pointers which are constrained to point to self-aligned objects of a minimum size have N least bits that are always zero, where N is a function of the object size. These unused bits may be used to store a code which identifies to the data structure the type of object the pointer points to. By incorporating this code into the root pointer, it retains the size and characteristics of other (ordinary) pointers within or external to the data structure and avoids the extra indirection or CPU cache line fill that an associated "type" or "info" word would require. Three available bits allow eight possible types to be encoded into the root pointer. These "type bits" are masked off, or ignored, when the pointer is dereferenced, i.e., used to address a target node.

As described, when the population of a tree is sufficiently large, preferably 32 indexes (i.e. larger than 31 indexes plus a population count word thus exceeding two cache lines on a machine with 16-word cache lines), an advantage is obtained by ensuring the root pointer points to an object which contains "global" information concerning the tree. This object may be a few words in size and typically contains information such as the total population of the tree or the amount of memory which is currently used by the tree. This object costs a negligible amount of memory in an overall bytes/index measurement. In considering implementation of such an object, it should be recognized that the presence of this object requires an extra indirection and possibly a CPU cache line fill when the tree is traversed. However, after initial retrieval, the information contained in the object typically remains in the cache to ensure immediate availability. The addition of the object also allows definition of additional enumerated types used to describe subnodes of the tree. A word containing eight bits provides 256 enumerated types. An aspect of at least on embodiment of the invention is the presence of the object to support "global data" adaptively to support larger population expanses. In other words, low-population trees are fast to access and efficient in memory, allowing applications to have huge numbers of low-population datasets. Once the population of one tree has grown large enough, the root pointer settles at a "final" type and points to a dataset-global data structure that describes the rest of the dataset. Similarly, when a subsidiary pointer grows large enough, it also settles on a final data type and points to a subset-global data structure that describes the rest of the subset. This use of dataset-global and subset-global data is a type of escape mechanism.

In a preferred embodiment of the present invention, a generic single-word root pointer is used which does not require a special allocation of larger root pointer objects. If the dataset is a null dataset, a standard null pointer is used. The type bits encoded in the root pointer should be passed through the application program interface and sent directly to the data structure manager without attempting to dereference the encoded type bits.

Figures 1, 6A:
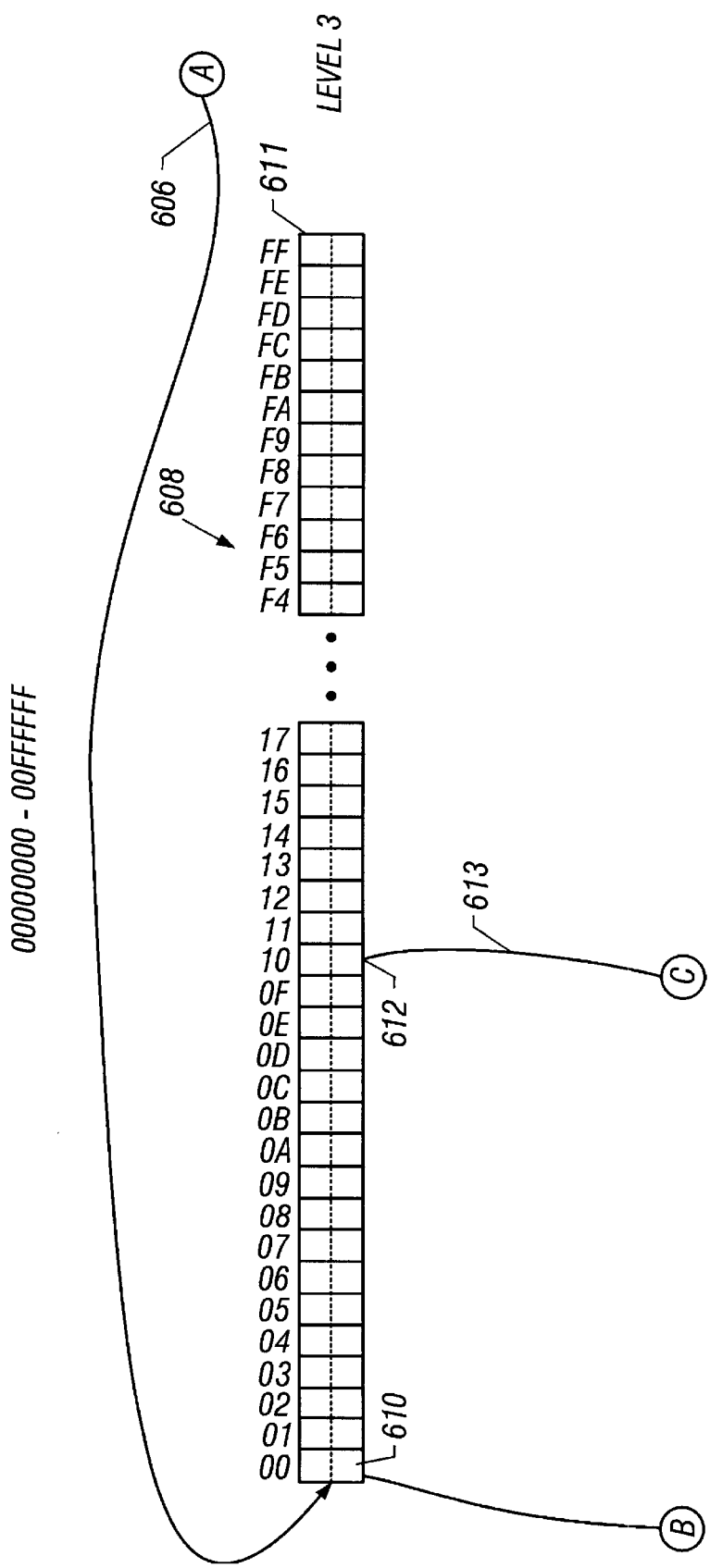
FIG. 1 is a diagram of a 32-bit word pointer storing a big-endian representation of address $A_0$–$A_{31}$ of a target object such as a node of a tree.
FIG. 6A is a diagram of a hierarchical digital tree structure incorporating pointer structures according to the invention.
Figures 3, 6A:
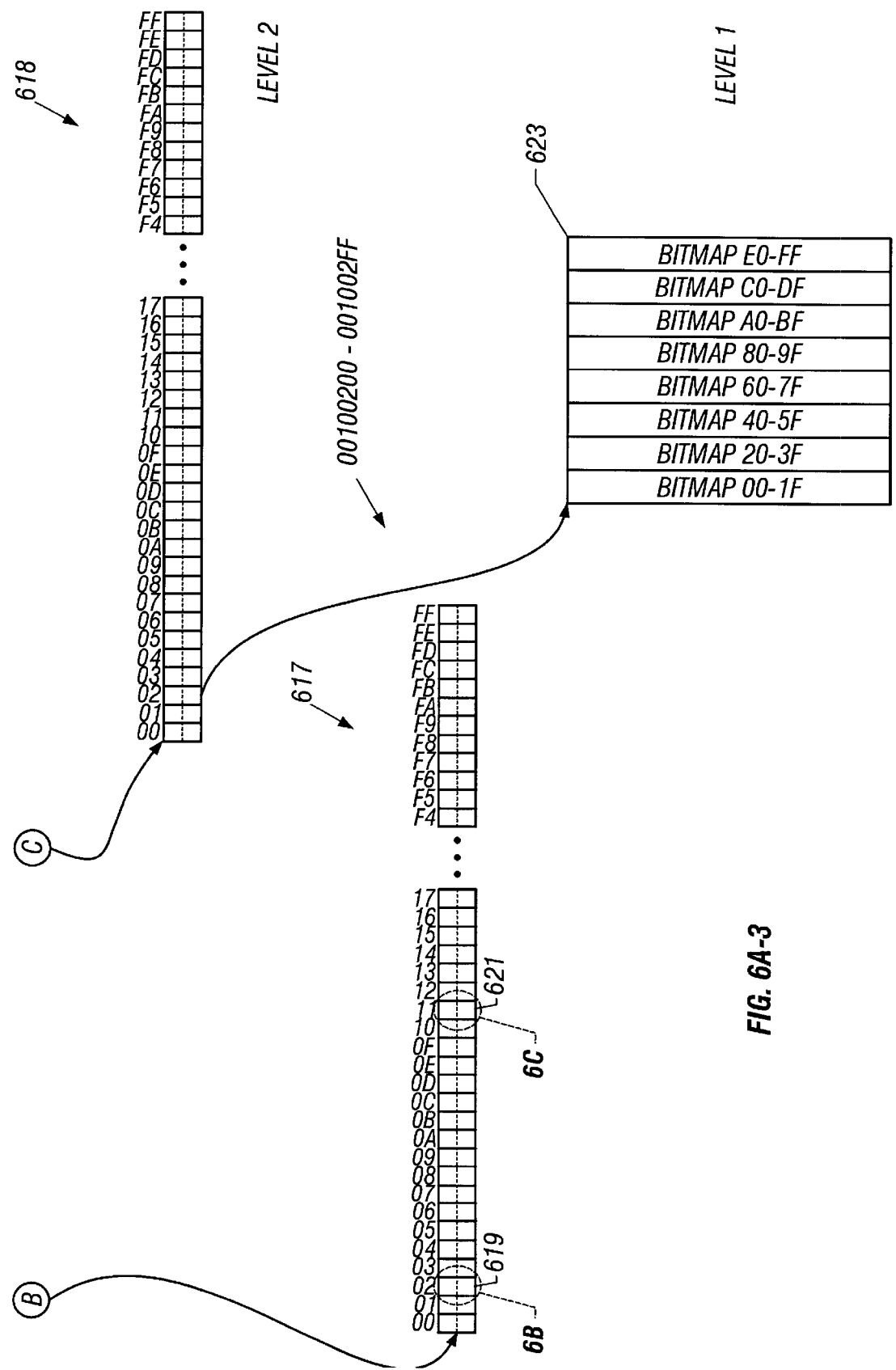
Figures 4, 6A:
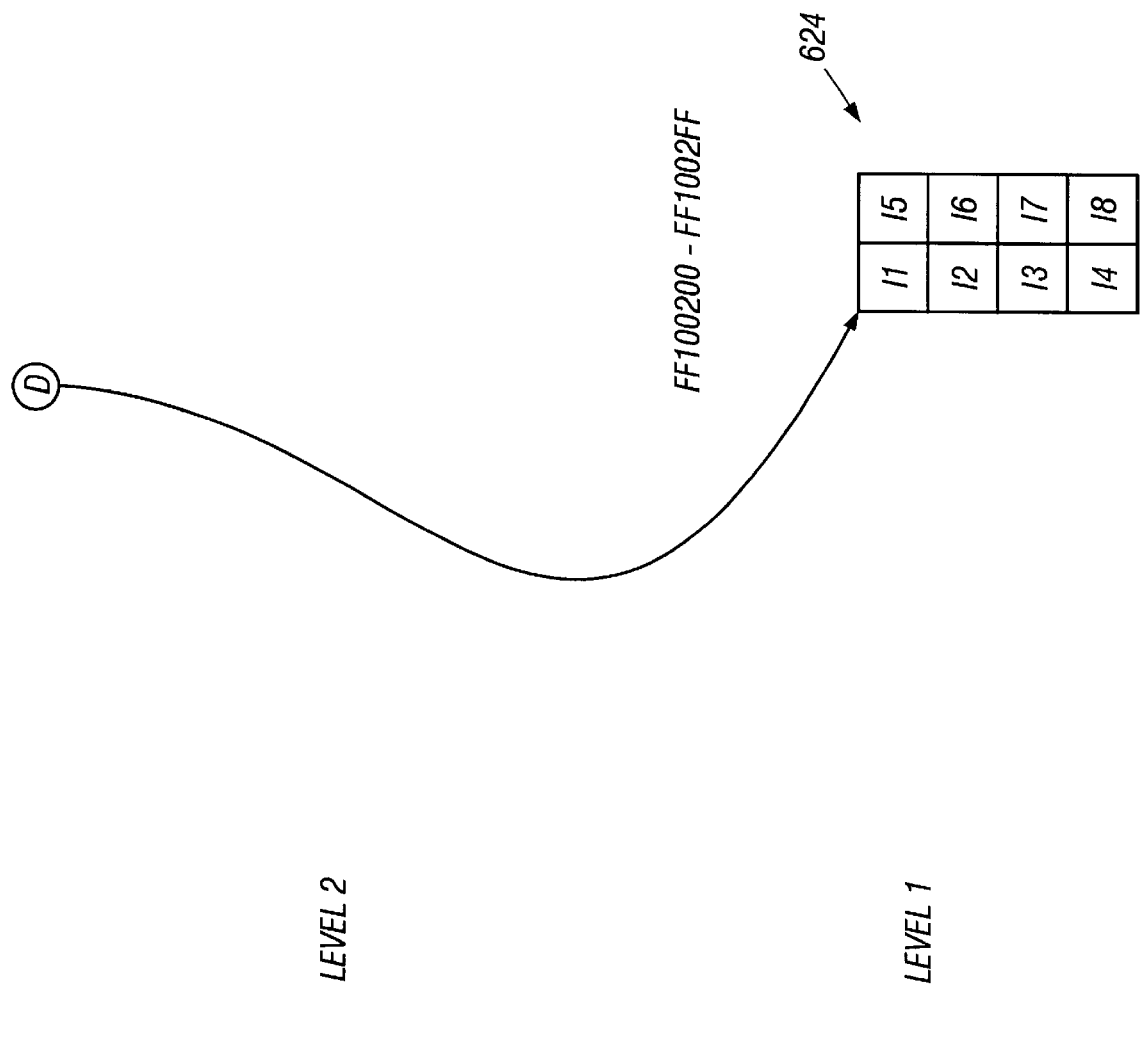

FIG. 1 is a diagram of a 32-bit word pointer storing a big-endian representation of address $A_0$–$A_{31}$ of a target object such as a node of a tree. In a big-endian representation, the "leftmost" bytes (those with the higher address in the figure, although this numbering convention may be reversed) are the most significant in multi-byte data types such as a 32-bit pointer. Of course, one skilled in the art would understand that encoding of auxiliary data is equally applicable to other data formats including little-endian architectures in which the rightmost bytes are most significant. As shown in FIG. 1, the least significant bits include address bits $A_0$, $A_1$ and $A_2$, representing decimal numbers 0 through 7. Since we assume that, for purposes of illustration and the present preferred embodiment of the invention, all structures (e.g., nodes) referenced by the pointer are aligned (i.e., start) on an 8-byte boundary, then address bits $A_0$, $A_1$ and $A_2$ each have a value of zero. (It should be noted that the actual values of $A_0$, $A_1$ and $A_2$ need not be zero, so long as they remain constant as is the case when the address is incremented in multiples of $A_3$, the next larger address bit, in this case in multiples of 8 bytes.)

FIG. 2 is a diagram of a mapping of the 32-bit pointer 201 into a masked big-endian address component and a type field. Note that the most significant 29 bits of the address pointer 201 including bits $A_{31}$ through $A_3$ are mapped onto the corresponding bits of address pointer 202 (and herein referred to as a memory pointer, i.e., the subset of bits required to address a node in memory), while the three least significant bits $A_2$ through $A_0$ are mapped onto, or used as, a type field 203.

Using these three least significant bits, eight distinct subsidiary node types may be designated. According to a preferred embodiment wherein the pointer may be used to reference one of two types of digital trees, the following encoding may be used as shown in Table 1.

TABLE 1

| Root Pointer Type | Description |
| --- | --- |
| 0 | If memory pointer is 0, tree is empty; otherwise root pointer is invalid |
| 1 | Root-level leaf of type 1 tree containing exactly 1 index |
| 2 | Root-level leaf of type 1 tree containing exactly 2 indexes |
| 3 | Root-level leaf of type 1 tree with a Population word and >2 indexes |
| 4 | Root-level leaf of type 2 tree containing exactly 2 indexes, or an invalid root pointer to a type 1 tree |
| 5 | Top-level branch of type 1 tree |
| 6 | Root-level leaf of type 2 tree with Population word and 1 or >2 indexes |
| 7 | Top-level branch of type 2 tree |

The root pointer types for the two types of trees are defined disjointly to detect root pointers for one type of tree inadvertently passed to a function for the other type of tree. A type 1 tree associates a value with each index, and those values may be root pointers to subsidiary type 1 trees, i.e. building a tree of trees. Root pointer type 4 allows some of the pointers (i.e. values) to point to other than subsidiary type 1 trees. This is useful for, among other things, storing a variable-size index divided into a series of fixed-size indexes in a hierarchy of type 1 trees, each of which supports a fixed-size index. Furthermore, upon reaching the end of a variable-size index, or the last fixed-size component of a variable-size index, or a unique trailing suffix of a variable-size index, a pointer (i.e. value) may point to a terminal data structure instead of a subsidiary type 1 tree. Finally, in a preferred embodiment, the memory manager allocates chunks of memory in rounded-up units; therefore root pointer types 1, 2, and for type 2 trees, 4, specify a root level leaf with a low population such that these small leaves need no population word and thus use less memory than they would otherwise.

FIG. 3 is a diagram of a null-type root pointer as created prior to insertion of data into a data structure according to certain embodiments of the invention. Although this may be considered a trivial or degenerate case, the invention allocates a type code for such an empty data structure configuration. The empty type may be represented by any assigned combination of the least significant 3 bits of root pointer 301 comprising its type field. For example, the code "000" might be assigned to designate an empty structure pointed to (i.e., the target of) root pointer 301 so as to match a conventional null pointer.

Figure 4:
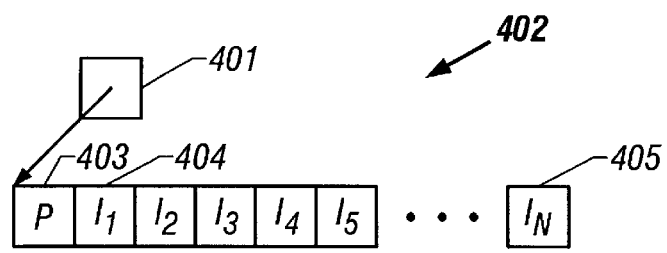
FIG. 4 is a diagram of a root pointer to a low-population tree type (in which the "tree" is a single root-level leaf node)

FIG. 4 is a diagram of a root pointer to a low-population tree type. In this illustration, root pointer 401 includes, in its three least significant bits, a type designation (e.g., "001") for a small dataset configuration of a data structure. In the illustration, a sufficiently low population of indexes may be stored directly under root pointer 401 in a root-level leaf 402, comprising a population count value 403 and a number of data items in the form of indexes $I_l$ through $I_n$, n preferably on the order of 31. In this context, "sufficiently low" is determined by the cache line size and word size of the machine. For example, if it is determined that a root-level leaf should not exceed two cache lines, then on a machine with a 64-byte cache line size and a 4-byte word size, each cache line can hold 16 root-level indexes and two cache lines can hold 32 indexes (or, in practice, 31 indexes plus one population word.) In this configuration, a small number of indexes dictates that the number of overhead bits (e.g., bits or bytes per index) used to provide information about the target object (i.e., root-level leaf 402) be correspondingly limited in number. Note that in a preferred embodiment, a small root-level leaf is directly accessible without calling a subroutine, without requiring internal knowledge of the data structure by the invoking application, such as by encapsulating this direct access in a C-language macro.

Figure 5:
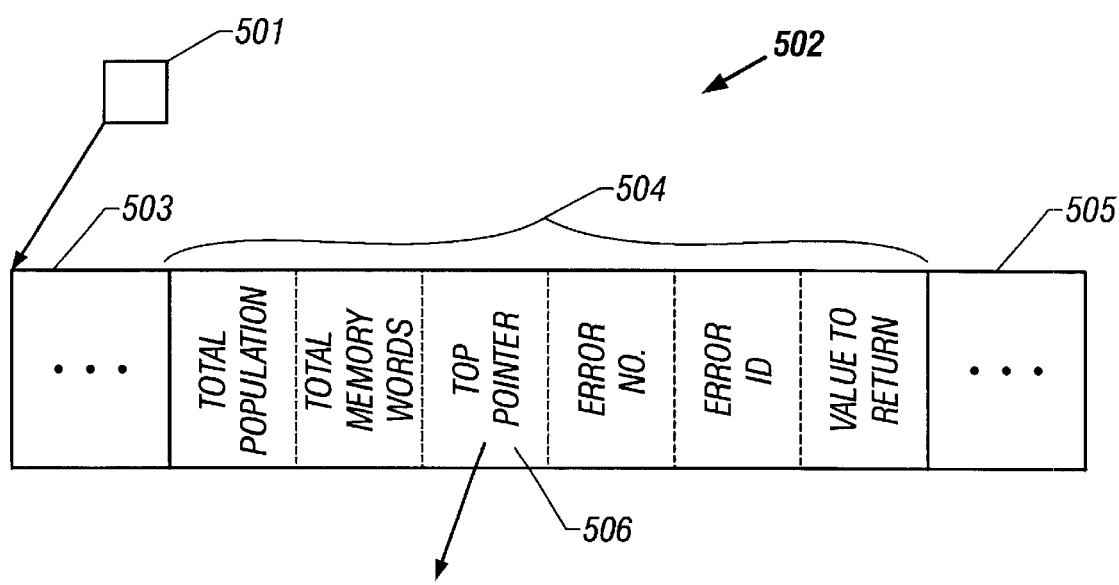
FIG. 5 is a diagram of a root pointer to a higher-population tree type including an intermediate population/memory node.

FIG. 5 is a diagram of a root pointer to a higher-population tree type including an interior information node which, in a preferred embodiment, is an intermediate population/memory data structure. In contrast to the smaller population accommodated by the low-population tree type where the root pointer points to a structure that is relatively small, simple, and fast to access (further in consideration of minimizing cache line fills), a transition to the higher-population tree type is marked by insertion of data beyond some trigger number, e.g., more than 31 indexes. In such case, root pointer 501 includes low order bits (i.e., in the example, the 3-least significant bits of the pointer) designating a the high-population data structure type. This high-population type implies that root pointer 501 is dereferenced to an intermediate informational structure in the form of population/memory node 502. Population/memory structure 502 includes several fields containing information about the object(s) (e.g., digital tree) pointed to by Top Pointer 506 including, for example:

Total Population storing a count of indexes stored in the referenced data structure;

Total Memory Words to provide rapid assessment of the overall memory efficiency of the tree (e.g., in bytes/index) to support opportunistic branch decompression and used to cross-check certain tree-specific functions;

Top Pointer referencing the first branch of the target tree;

Error number and error identification fields used to pass error information up from a lower level during tree traversal; and Value to return field used to pass a value (or a pointer to a value area) back from a low level recursion without passing a parameter separate and apart from the population/memory node 502.

Note that in certain embodiments, the Top Pointer is not strictly necessary. Instead, the population/memory structure 502 might be adjacent to the first branch of the target tree.

FIG. 6A is a diagram of a hierarchical digital tree structure incorporating pointer structures according to a preferred embodiment of the invention. In this implementation of a high population data structure, a hybrid digital tree uses a variety of hybrid abstract data type data structures (ADTs) to maximize memory utilization efficiency while minimizing index access time. Because of the relatively high population of indexes stored in this illustration, root pointer 601 references intermediate population/memory node 602 containing information about the pointed-to tree. In turn, population/memory node 602 references a top, 256-way branch node 603, which points to 1-of-256 possible subexpanses based on decoding of a first byte of a 4-byte index. Similarly, a next byte is decoded at each level as the tree is traversed until a leaf node at level 1 is reached. Alternative ADTs provide for skipping levels of the tree (e.g., from level 3 branch node 609 directly to level 1 inverse linear leaf node 624.) Other ADTs provide for branch and leaf compression for optimizing memory efficiency and index access time so as to, in combination with the present invention, provide a highly efficient data structure applicable to both small and large sets of data.

Figure 6B:
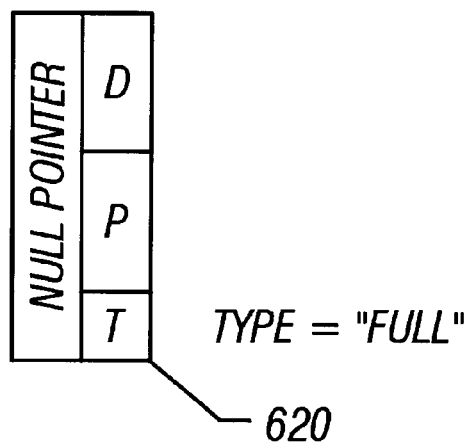
FIG. 6B is a diagram of a rich pointer structure representing a fall subexpanse of indexes.
Figure 6C:
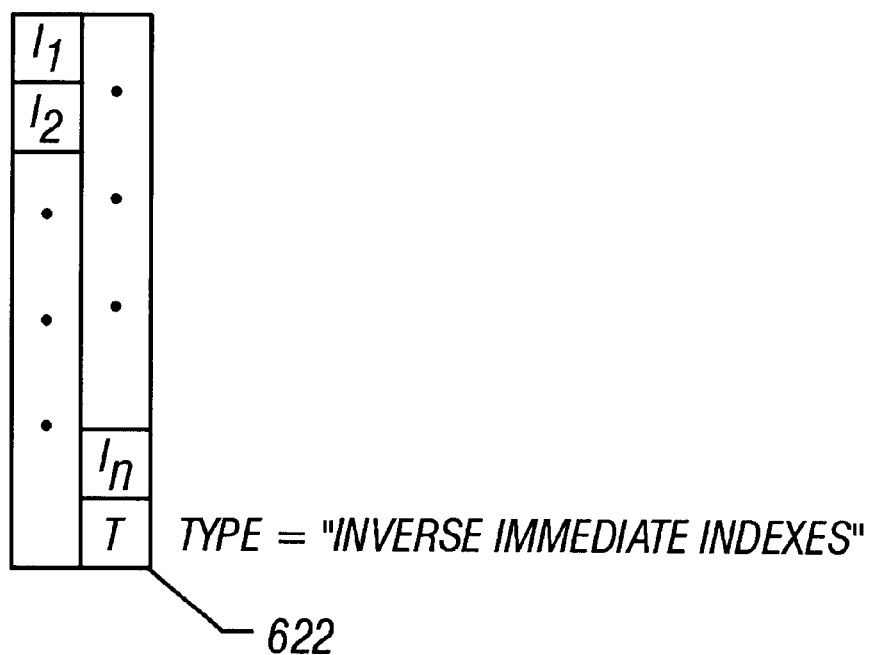
FIG. 6C is an immediate pointer indicating an inverse immediate type and storing index exceptions.

The hierarchical digital tree structure of FIG. 6A further illustrates structures accommodating full and substantially fall populations of indexes within a lowest level subexpanse. According to a preferred implementation of the invention, a full population (i.e., all 256 indexes valid) is indicated by rich pointer 619, having a "full" type designation 620 as shown in FIG. 6B. The "full" type indicates that the subexpanse is fully populated, i.e., in the present case, all indexes within the range of 00000200–000002FF are valid. "Nearly full" expanses of indexes may employ an inverse list structure for enumerating only invalid indexes, that is, the exceptions to an otherwise fully populated expanse of indexes. Where there are a limited number of "exceptions", the missing or invalid indexes may be indicated in an immediate structure as shown in inverse immediate index rich pointer 621 (FIG. 6A) which includes a type designation 622 (FIG. 6C) of inverse immediate indexes and lists indexes $I_l$ through $I_n$ that are missing from (i.e., that are invalid rather than valid in) the sub expanse. When the number of invalid indexes exceeds the storage available in an inverse immediate index rich pointer, an inverse leaf node 624 (FIG. 6A) is used, the associated rich pointer 615 having a type indicating an inverse leaf type and pointing to the leaf node. Note that in the normal progression of index insertion into the tree, an initially empty subexpanse represented by an absent or null rich pointer is converted to an immediate index rich pointer, then becoming a linear leaf rich pointer that points to a subsidiary linear leaf node. At the lowest level of the tree, a linear leaf which overflows is then converted to a bitmap leaf such as 623. When a bitmap leaf is nearly fall, it may be converted to an inverse linear leaf node such as 624. As additional indexes are inserted, this inverse linear leaf node may be converted to an inverse immediate index rich pointer such as 621 in the parent branch. Finally, when the last index is inserted such that the rich pointer's expanse is full, the rich pointer is converted to the full expanse type such as 619.

Figure 7:
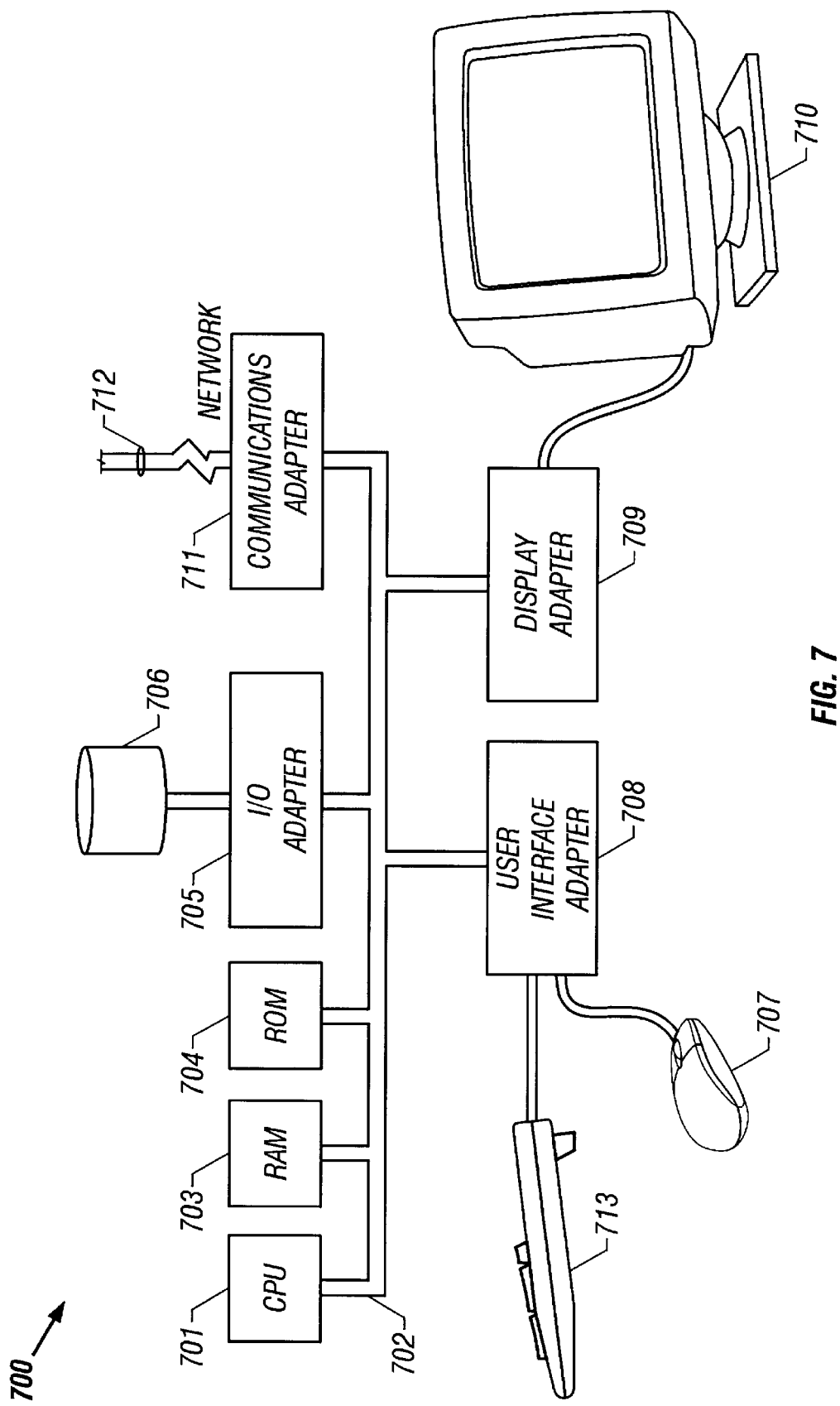
FIG. 7 is a diagram of a computer system capable of supporting and running a memory storage program implementing and maintaining a data structure according to the invention.

FIG. 7 is a diagram of a computer system capable of supporting and running a memory storage program implementing and maintaining a data structure according to a preferred embodiment of the invention. Thus, although the present invention is adaptable to a wide range of data structures, programing languages, operating systems and hardware platforms and systems, FIG. 7 illustrates on such computer system 700 comprising a platform suitable to support various embodiments of the present invention. This rather illustrative, generic computer system includes Central Processing Unit (CPU) 701 coupled to system bus 702. CPU 701 may be any general purpose CPU, such as an HP PA-8500 or Intel Pentium processor. However, the present invention is not restricted by the architecture of CPU 701 as long as CPU 701 supports the inventive operations as described herein, e.g., the use of pointers. System bus 702 is coupled to Random Access Memory (RAM) 703, which may be SRAM, DRAM or SDRAM. ROM 704 is also coupled to system bus 702, which may be PROM, EPROM, or EEPROM. RAM 703 and ROM 704 hold user and system data and programs as is well known in the art.

System bus 702 is also coupled to input/output (I/O) controller card 705, communications adapter card 711, user interface card 708, and display card 709. The I/O card 705 connects to storage devices 706, such as one or more of a hard drive, a CD drive, a floppy disk drive, a tape drive, to the computer system. Communications card 711 is adapted to couple computer system 700 to network 712, which may be one or more of a telephone network, a Local (LAN) and/or a Wide-Area (WAN) network, an Ethernet network, and/or the Internet network and can be wire line or wireless. User interface card 708 couples user input devices, such as keyboard 713 and pointing device 707, to computer system 700. Display card 709 is driven by CPU 701 to control display device 710.

While the invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

What is claimed is:

1. A method of storing data in a data structure comprising the steps of:

storing a population of indexes directly under a root pointer;

encoding, in unused bits of said root pointer, a code indicating a configuration of said data structure wherein said indexes are stored directly under said root pointer;

converting said configuration of said data structure to include a top-level branch node;

modifying said code to indicate a reconfiguration of said data structure to a hierarchical configuration; and rearranging said population of indexes into said hierarchical configuration.

2. The method of claim 1 further comprising a step of inserting an information node between said root pointer and said top branch.

3. The method of claim 1 further comprising a step of detecting via said code an invalid pointer passed by a calling application.

4. A method of storing data in a data structure comprising the steps of:

storing indexes in a hierarchical first data structure of a first structure type, said first data structure comprising branch nodes and leaf nodes under a first root pointer;

associating a value with each of said indexes;

using said value as a second root pointer to a second data structure subsidiary to said first data structure;

encoding a root pointer type of said second data structure in said second root pointer; and identifying said root pointer type as corresponding to one of the same as and different from said first structure type.

5. The method according to claim 4 further comprising the steps of:

dividing a variable-size index into a plurality of fixed-size indexes;

inserting a first of said fixed-size indexes into said first data structure; and inserting a second of said fixed-size indexes into said second data structure.

6. The method according to claim 5 further comprising the steps of:

inserting a last of said plurality of fixed-size indexes into a terminal data structure of a second data structure type; and setting in said value corresponding with said last fixed-size index said root pointer of said root pointer type corresponding to said second data structure type.

7. A data structure storing data in a computer memory, said data structure accessible by an application program being executed on a data processing system, said data structure including:

a hierarchy of nodes including interior nodes and leaf nodes;

node pointers connecting said nodes from parent ones of said nodes to subsidiary ones of said nodes;

a root pointer pointing to a top one of said nodes; and wherein each of said nodes characterized as having a minimum size and consistent alignment, and a subsidiary node type of each of said subsidiary nodes encoded in a number of bits of respective ones of said node pointers.

8. The data structure according to claim 7 wherein said subsidiary node type indicates that said subsidiary node contains subtree information describing data stored in ones of said nodes subsidiary to, and forming a subtree of, said subsidiary node.

9. The data structure according to claim 7 wherein said number of bits comprises a number of least significant bits of said node pointers.

10. A data structure storing data in a computer memory, the data structure accessible by a computer program being executed on a data processing system including the memory, said data processing system supporting a simple pointer constituting a predetermined number of bits, said data structure comprising:

a root pointer including address information constituting a memory pointer and a data field configured to store information about a subsidiary object in said data structure addressed by said memory pointer; said data field embedded in said root pointer such that said root pointer constitutes no more than said predetermined number of bits, said memory pointer constituting less than said predetermined number of bits.

11. The data structure according claim 10 further comprising a bitmask configured to convert said memory pointer into said simple pointer.

12. The data structure according to claim 10 wherein said data structure is configured in a first configuration to store a relatively small number of indexes, said data structure in said first configuration comprising a root-level leaf node wherein said root pointer is configured to identify a type of said root-level leaf node.

13. The data structure according to claim 12 wherein said root pointer identifies a number of keys stored in said root-level leaf node.

14. The data structure according to claim 12 wherein said root-level leaf node is directly accessible without calling a subroutine.

15. The data structure according to claim 10 wherein said data structure is arranged in a hierarchy of interior branch nodes and terminal leaf nodes, said root pointer configured to point to an interior information node containing information about and a pointer to a first subsidiary one of said branch and leaf nodes.

16. The data structure according to claim 15 wherein said interior information node is configured to store at least one of an amount of memory used by the data structure, and a total population of the data structure.

17. The data structure according to claim 10 wherein said data field indicates a type of the data structure to which said memory pointer points.

18. The data structure according to claim 17 wherein said type includes an indication that said memory pointer is a null pointer and there is no associated data structure.

19. The data structure according to claim 17 wherein said type includes an indication that said memory pointer points to said data structure containing a sufficiently low population of indexes that said data structure includes less than a predetermined number of levels.

20. The data structure according to claim 19 wherein said data field further includes an indication of a population count of indexes stored in said data structure.

21. The data structure according to claim 17 wherein said type indicates that said memory pointer points to said data structure containing at least a threshold number of indexes such that said data structure is configured to amortize memory needed for global data useful in the management of said data structure, said memory needed amortized over a minimum number of indexes represented by said threshold value.

22. The data structure according to claim 21 wherein said memory pointer points to a first node of a hierarchical data structure wherein said first node contains information about a remainder of said hierarchical data structure.

23. The data structure according to claim 10 wherein said data field resides in the least significant bits of said root pointer, said least significant bits that would otherwise have a fixed value for a consistently aligned object of any minimum size.

* * * * *